United States Patent [19]

Gakhar et al.

[11] Patent Number: 5,271,441

[45] Date of Patent: Dec. 21, 1993

[54] ROSETTE MAKER ROUTER ACCESSORY USED IN CONCERT WITH A ROUTER ATTACHED TO A ROUTER TABLE

[75] Inventors: Ved P. Gakhar; Richard A. Dossett, both of Louisville, Ky.

[73] Assignee: Vermont American Corporation, Louisville, Ky.

[21] Appl. No.: 16,702

[22] Filed: Feb. 11, 1993

[51] Int. Cl.⁵ .................................................. B27C 5/00
[52] U.S. Cl. ........................... 144/134 A; 144/2 R;
 144/134 R; 144/137; 144/371; 144/136 R;
 409/165; 409/225; 409/229
[58] Field of Search .............. 144/2 R, 134 R, 134 A,
 144/136 R, 137, 371; 409/164, 165, 198, 225,
 226, 229; 269/102

[56] References Cited

U.S. PATENT DOCUMENTS

| | | | |
|---|---|---|---|
| 3,380,322 | 4/1968 | Brault | 409/165 |
| 4,299,263 | 11/1981 | Skinner | 144/144.5 |
| 4,319,615 | 3/1982 | Ditmanson | 144/144 R |
| 4,353,672 | 10/1982 | Smith | 144/144 R |
| 4,565,229 | 1/1986 | Larson | 144/134 A |

*Primary Examiner*—W. Donald Bray
*Attorney, Agent, or Firm*—Middleton & Reutlinger

[57] ABSTRACT

A router accessory used in concert with a router attached to a router table. The accessory can be used to produce rosettes, model wheels, buttons, coasters, and other circular decorated projects, for example. In the preferred embodiment, a wooden workpiece can be positioned horizontally above a selected router bit. The workpiece zero point, which may be the workpiece center, can be off-set horizontally from the router bit. The accessory can then be used to lower the workpiece onto the router bit, so that rotation of the workpiece routs a circular cut equidistant from the workpiece zero point. The maximum depth of cut can be set. The off-set can be changed to make additional circular cuts into the workpiece, as desired.

13 Claims, 3 Drawing Sheets

ROSETTE MAKER ROUTER ACCESSORY USED IN CONCERT WITH A ROUTER ATTACHED TO A ROUTER TABLE

BACKGROUND OF THE INVENTION

1. Field of the Invention

The present invention relates to a router accessory used in concert with a router attached to a router table. The accessory can be used to produce rosettes, model wheels, buttons, coasters, and other circular decorated projects, for example. The accessory is used to permit the routing of at least one circular cut about the zero point of a wooden workpiece. Usually, for making rosettes, a square workpiece is used, with the zero point being the center point of the square workpiece. However, circular-shaped or other-shaped workpieces can also be used to make rosettes. Also, a plurality of concentric circular cuts are usually routed into the workpiece. The router bit selected determined the shape of the circular cut.

2. Description of the Prior Art

Basic routers are generally power-operated hand tools which can be used to cut patterns in wooden workpieces. Many types of cuts can be made, depending on the router bit selected. Router attachments are also known. For example, U.S. Pat. Nos. 4,942,912 and 5,090,461 teach attachments which aid a router user in making router cuts for biscuit joinery and dentil moulding, respectively.

Router tables have been developed which permit a router to be attached underneath the table so that the router bit can be extended upward through an opening in the table. For example, under the trademark "CRAFTSMAN", Sears sells an industrial router table model #9-25490 and standard router tables, such as models #9-25475 and #9-25479. Router table attachments, such as, for example, a miter gauge, are available to permit a wooden workpiece to be accurately routed. The tables mentioned above have a miter guide slot thereacross. The rosette maker of the present invention is designed to be used with such a router table, wherein a workpiece is moved to engage a fixed router bit to rout a rosette.

DEFINITIONS

Throughout the application the following term is used as defined below:

A rosette is generally defined in Webster's Dictionary as "a carved, painted, or sculptured architectural ornament having a circular arrangement of parts resembling the petals of a rose." Ornamental rosettes are often found in the upper corners of door facings. Generally, rosettes have a plurality of concentric circles to resemble a rose.

SUMMARY OF THE INVENTION

The present invention is for a router accessory, primarily used in the making of rosettes, and the like. The router accessory of the preferred embodiment of the present invention is designed to be used in concert with a router attached to a router table, such as those mentioned above which include a miter guide slot thereacross. The rosette maker of the preferred embodiment has a housing attachable to the front and the rear of the router table. The housing includes feet which engage the miter guide slot for increased stability.

With the rosette maker or the present invention, a workpiece is affixed to a face plate, the face plate is affixed to the rosette maker, the workpiece is off-set a preselected distance from the center of the router bit, and then the workpiece is moved and rotated to engage a fixed router bit to rout a circular rosette. Additionally, those skilled in the art can see how the teachings of the preferred embodiment of the present invention can be used to make an equivalent stand-alone rosette maker attachable directly to a router, not requiring a router table. In such an attachment, to make a rosette, either the workpiece could be moved around a relatively fixed router or a router could be moved around a relatively fixed workpiece.

Finally, the present invention comprises a router accessory, comprising: a housing connectable to a router table and securable thereon; means to vertically position a workpiece above a router bit, the router bit being contained by a router attached to the router table, the workpiece having a preselected zero point; means to horizontally off-set the zero point of the workpiece a preselected horizontal distance from the router bit; means to vertically move the workpiece to engage the router bit; and, means to rotate the workpiece about the zero point to rout a circular cut, the circular cut being equidistant from the zero point.

BRIEF DESCRIPTION OF THE DRAWINGS

A better understanding of the present invention will be had upon reference to the following description in conjunction with the accompanying drawings, wherein:

FIG. 2 also shows a cross-section of the router table on which the rosette maker is attached; and, FIG. 2 further shows the shaft through the index flange positioned directly above the, router bit so that the workpiece has a zero radius off-set; FIG. 3 further shows the attachment of the rosette maker to the router table and the path of the center of the shaft to off-set the workpiece for routing.

DETAILED DESCRIPTION OF THE PREFERRED EMBODIMENT

Figure 1:
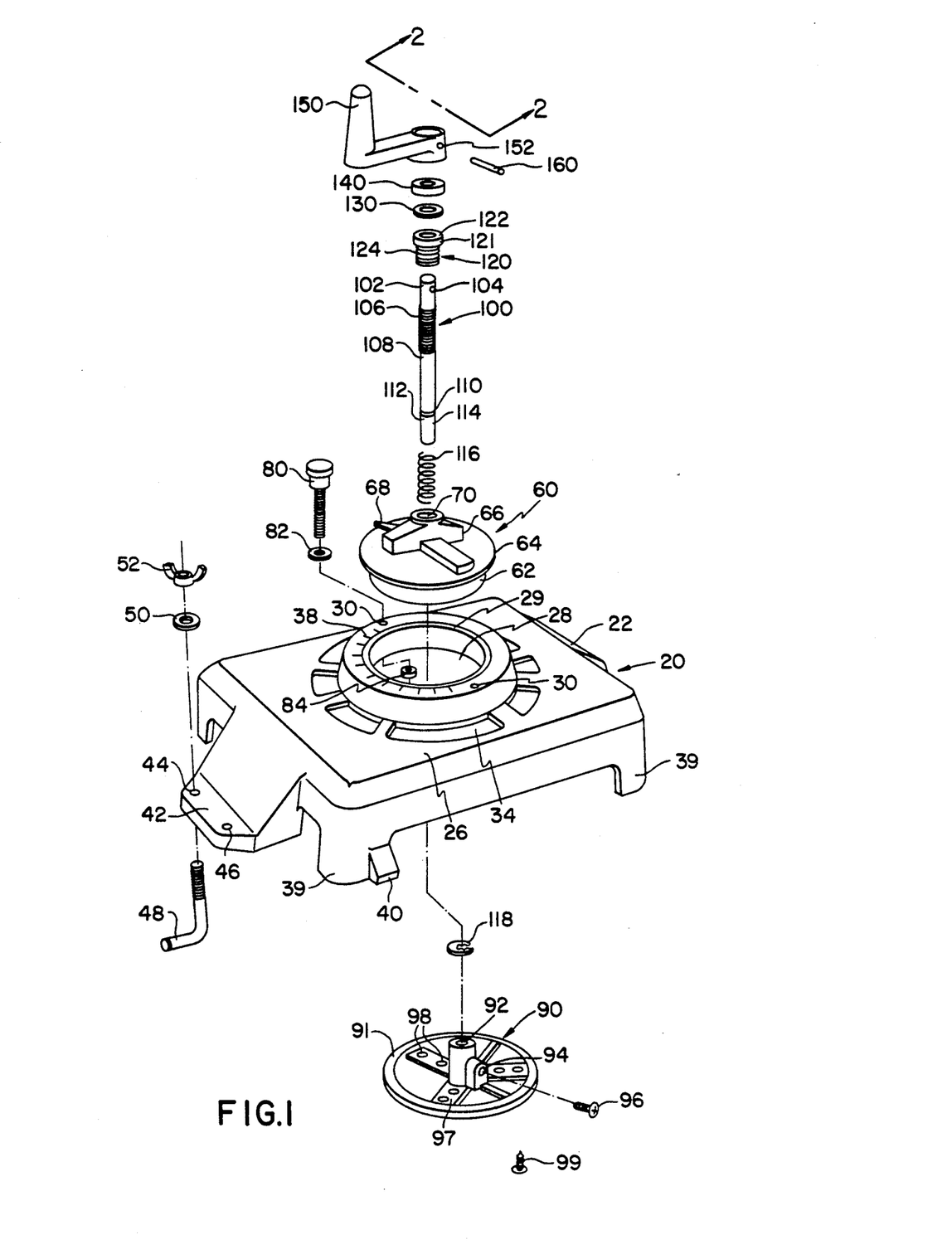
FIG. 1 shows an exploded perspective view of the rosette maker of the preferred embodiment of the present invention.
Figure 2:
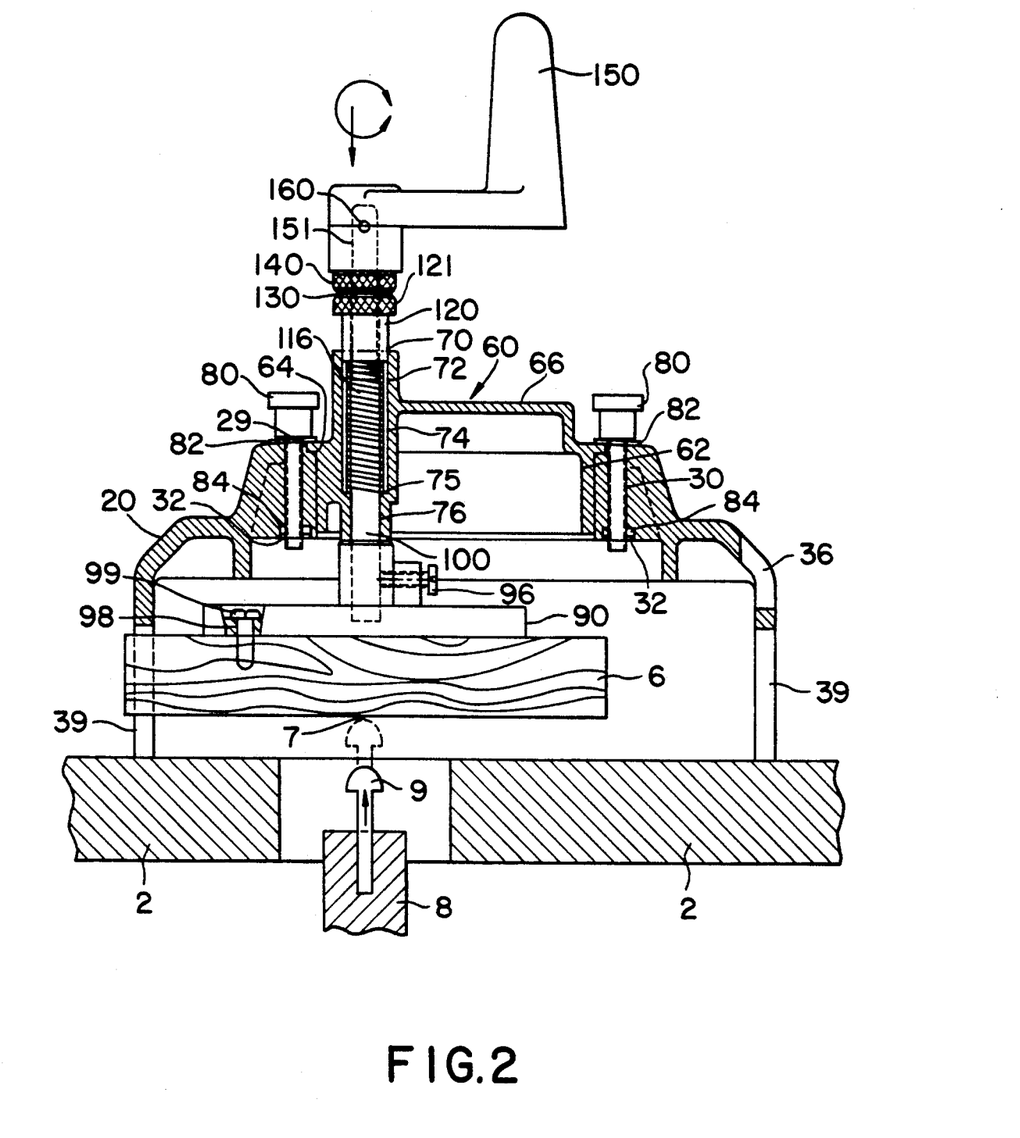
FIG. 2 shows a cross-sectional view of the housing and index flange of the rosette maker of the preferred embodiment, shown generally along the lines 2—2 of FIG. 1 looking toward the rear of the housing, the face plate having a workpiece attached thereto.
Figure 3:
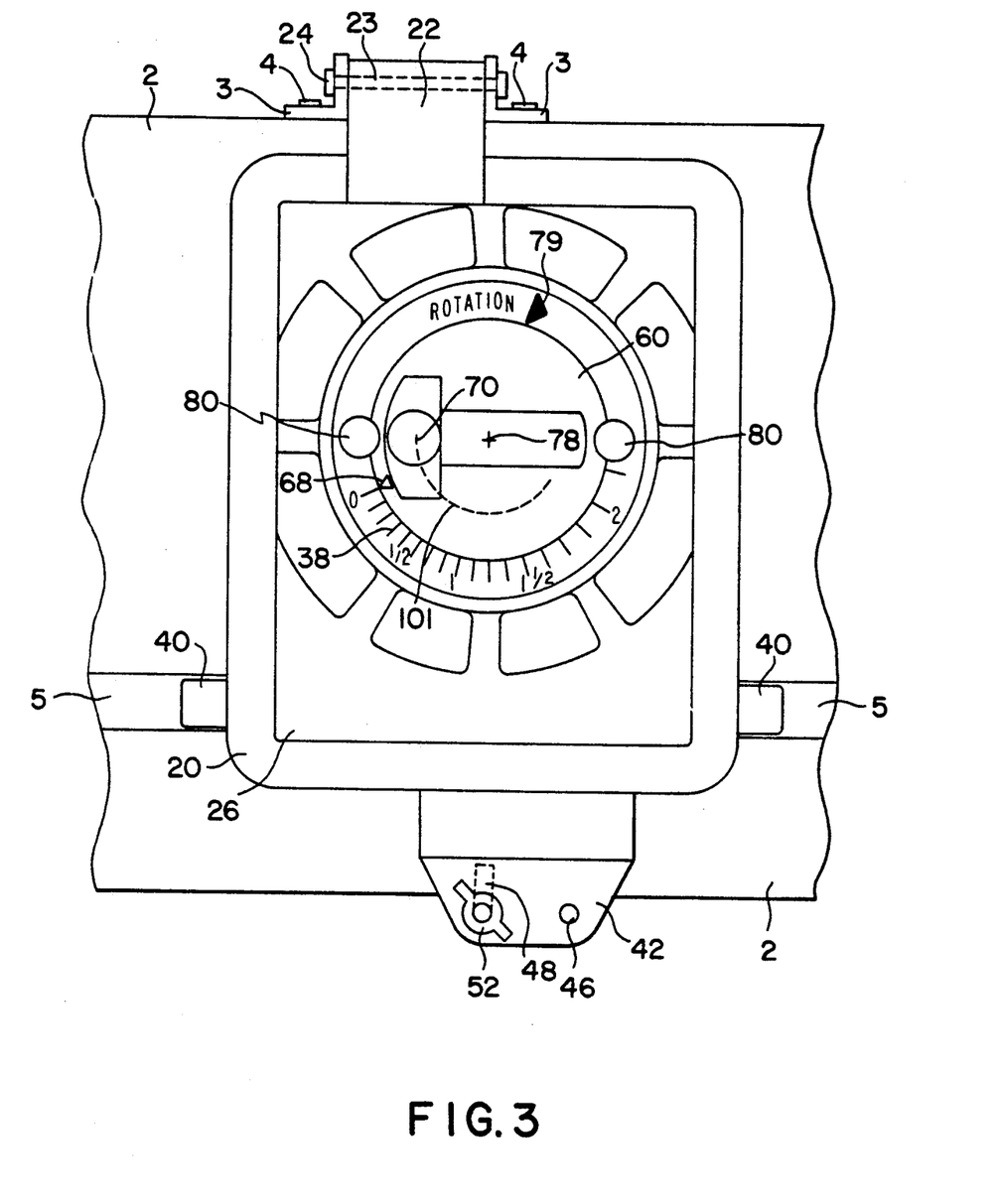
FIG. 3 shows a top view of the housing and index flange received therein of the rosette maker of the preferred embodiment.

With reference to the figures, the router accessory 10 of the preferred embodiment of the present invention is shown. Router accessory 10 includes a housing 20 connectable to a router table 2 and securable thereon and, as will be explained hereinafter, means to vertically position a workpiece 6 above a router bit 9, the router bit 9 being contained by a router 8 attached to the router table 2, the workpiece 6 having a preselected zero point 7; means to horizontally off-set the zero point 7 of the workpiece 6 a preselected horizontal distance from the router bit 9; means to vertically move the workpiece 6 to engage the router bit 9; and, means to rotate the workpiece about the zero point 7 to rout a circular rosette, the circular rosette being equidistant from the zero point 7.

Housing 20 is shown having a rear router table connecting portion 22, a center portion 26, and a front router table connecting portion 42. Router table 2 is shown having a pair of rear router table connecting brackets 3 fastened to the rear of table 2 by a pair of screws or bolts 4, as appropriate for the table. For a Sears standard router table, brackets like those identified as 3 are affixed and generally retain a safety guard, which is removed and replaced by accessory 10. Rear portion 22 has a horizontal bore 23 therethrough which receives a connecting rod 24. Bore 23 parallels the rear of table 2. Rod 24 passes through the holes in brackets 3 which retained the safety guard to hingedly connect the accessory 10. The Sears industrial table, previously mentioned, as currently sold, does not include brackets 3, so equivalent brackets must be mounted on the industrial table before the accessory 10 can be properly installed.

Front router table connecting portion 42 has a pair of vertical clamp rod bores 44 and 46 therethrough. Bore 44 is positioned for use with a standard router table and bore 46 is positioned for use with an industrial router table, as previously discussed. A threaded router table clamp rod 48, shown having a ninety degree bend therein, has its threaded end inserted upward through the appropriate bore 44 or 46. A flat washer 50 is placed over the threaded portion of rod 48 and a wing nut 52 is then threaded onto the threaded portion of rod 48. The bent horizontal portion of clamp rod 48 will be inserted under the front of the router table 2 and wing nut 52 will be tightened to secure accessory 10 to table 2.

Center portion 26 of housing 20 is shown having a plurality of router table engaging legs 39 which, along with some of the bottom portion of front router table connecting portion 42, support the housing 20 on table 2. Router table 2 is shown having a slot 5 thereacross. A pair of feet 40 are connected to center portion 26 of housing 20 positioned so that they can engage slot 5. In use, these feet extend downward further than legs 39, as legs 39 engage the table work surface and feet 40 engage the slot 5 therein. Feet 40 help secure accessory 10 to table 2 by helping resist horizontal rotational forces exerted during use of accessory 10. Feet 40 can be totally or partially removable for use on tables which might not have a slot 5 appropriately positioned.

Approximately at its center, center portion 26 of housing 20 has a raised and circularly hollowed index flange receiving portion 28. Portion 28 has a relatively small circular lockable lip groove 29 which is concentric with portion 28, but with a slightly larger diameter.

Portion 26 also contains a pair of vertical lock knob bores 30, each bore 30 having a larger diameter nut recess 32 from the underneath of portion 26. A plurality of graduated radius offset indicators 38 are provided partway around the circular hollow of portion 28. For example, the accessory 10 of the preferred embodiment shown is designed to receive a workpiece 6 having maximum dimensions of 5¼" by 5¼" by 1" thick. With this preferred embodiment accessory 10, the maximum off-set radius is 2¼" and the graduated radius off-set indicators 38 show off-sets from 0" to 2¼" in ¼" increments. Because of the way the off-set is accomplished, as will be explained later, the ¼" increments are not uniformly spaced apart, but are closer together toward the 0" off-set indicator than they are toward the 2¼" off-set. Naturally, the dimensions of accessory 10 could be enlarged to make an accessory capable of handling larger workpieces and an off-set radius greater than 2¼".

Center portion 26 is also shown having a plurality of ventilation openings 34 around index flange receiving portion 28.

Index flange 60 is shown having a received portion 62, a lockable lip portion 64, and a top portion 66. In the preferred embodiment, received portion 62 is of cylindrical-shape with an approximate height of ¾", for example. Received portion 62 is partway hollowed and has a diameter just less than the diameter of the index flange receiving portion 28. This permits received portion 62 to fit snugly into the index flange receiving portion 28 of housing 20, but not so snugly as to restrict rotation of portion 62 within portion 28.

Lockable lip portion 64 of index flange 60 is a relatively thin disk-shaped portion which has a diameter greater than the diameter of the index flange receiving portion 28. Lockable lip portion 64 fits into lockable lip groove 29 to vertically position index flange 60 relative to index flange receiving portion 28 of housing 20. With index flange 60 inserted into index flange receiving portion 28, a pair of threaded lock knobs 80, each having a flat washer 82 inserted thereon, are downwardly inserted into lock knob bores 30. Nuts 84 are placed into nut recesses 32 of housing 20 and threadably receive respective lock knobs 80. If lock knobs 80 are "loose", index flange 60 is rotatable relative to housing 20. When lock knobs 80 are tightened, washers 82 press against lip portion 64 and index flange receiving portion 28, so that index flange 60 is secured to housing 20.

Top portion 66 of index flange 60 includes a radius pointer 68 which points to the correct off-set radius indicator 38, depending upon the rotational alignment of index flange 60 within index flange receiving portion 28, as is explained hereinafter. A vertical shaft bore 70 through index flange 60 is included which provides an opening from the top of top portion 66 to the bottom of index flange received portion 62. While index flange 60 can be manufactured in many ways, for example, the index flange 60 of the preferred embodiment is made of plastic which is injection molded. Shaft bore 70 has a top portion which functions as an adjustment bushing receiving portion 72 having a uniform diameter; a middle portion which functions as a spring receiving portion 74, portion 74 having a decreasing diameter from top to bottom where portion 74 terminates in a spring lip 75, wherein the decreasing diameter is provided to facilitate the injection molding of index flange 60; and, a bottom portion which functions as a shaft receiving portion 76 having a uniform diameter. Shaft bore 70 is of sufficient height so that opposed bore portions 72 and 76 provide two bearing areas which provide sufficient vertical support to a shaft 100 inserted therein without permitting the shaft 100 to "wiggle", as is explained hereinafter.

Vertical shaft 100 is shown having a top handle portion 102 having a horizontal pin bore 104 therethrough; a threaded adjustment portion 106; a spring receiving portion 108; a groove portion 110 to receive an "E"-ring; and, a face plate portion 112. As shaft 100 will be rotated, face plate portion 112 has a "flattened" side 114 which permits a face plate 90, described later, to be attached to shaft 100 so that face plate 90 will rotate in concert with shaft 100.

Adjustment bushing 120 has a threaded inside portion 122 and external graduated depth gauge markings 124. Markings 124 can be, for example, spaced vertically every ⅛" around the outside circumference of adjustment bushing 120. The topmost part of bushing 120 functions as a downward limiter portion 121, having a diameter greater than the portion having markings 124.

Adjustment bushing 120 is threaded onto threaded adjustment portion 106 of shaft 100. A washer 130, of nylon material, for example, is then placed over shaft 100 to abut the top of bushing 120. A threaded adjustment knob 140 is then threaded onto threaded adjustment portion 106 of shaft 100 to abut washer 130. A rotational handle 150 has an upward vertical shaft receiving bore 151 therein and a horizontal bore 152 therethrough, bore 152 intersecting bore 151. Handle 150 is mounted onto shaft 100 by inserting the handle portion 102 thereof into upward vertical shaft receiving bore 151. Bores 152 and 104 are aligned and pin 160 is inserted through bores 152 and 104 to securely attach handle 150 to shaft 100.

A cylindrical-shaped compression spring 116 slides over shaft 100 from the face plate portion 112 upward to engage the bottom of bushing 120. This connected handle 150, knob 140, washer 130, bushing 120, and shaft 100 with spring 116 are inserted downward through shaft bore 70. Downward pressure is exerted so that groove 110 is accessible from below bore 70. "E"-ring 118 is pressed onto shaft 100 at groove 110 to retain shaft 100 within bore 70. Face plate portion 112 of shaft 100 thus extends downward below "E"-ring 118, so as to permit attachment of face plate 90, explained later.

Without external pressure on shaft 100, spring 116, resting on lip 75, pushes upward on bushing 120 so that "E"-ring 118 rests against index flange 60 at the bottom opening of bore 70. This determines the maximum upward movement of shaft 100 in bore 70. At this maximum point, at least the bottom of the portion of bushing 120 having markings 124 is received into the top of bore 70. As adjustment bushing receiving portion 72 has a diameter slightly larger that bushing 120 and shaft receiving portion 76 has a diameter slightly larger that shaft 100, shaft 100 will not "wiggle" within bore 70. It was earlier noted that tapered portion 74 has a diameter decreasing from its top to its bottom at spring lip 75 to facilitate the injection molding manufacturing process. Even though decreasing, this diameter is everywhere sufficient to not interfere with spring 116.

Shaft 100 can be pushed downward, thus compressing spring 116, until reaching the lower limit, which is controlled by the location of limiter portion 121 of bushing 120 on threaded portion 106 of shaft 100. When downward pressure on shaft 100 is relieved, spring 100 decompresses so that shaft 100 is moved to its upward limit where "E"-ring 118 rests against index flange 60 at the bottom opening of bore 70.

Face plate 90 is shown having a vertical shaft receiving bore 92 and a horizontal bore 94. After a workpiece 6 is attached to face plate 90, explained later, bore 92 is inserted over face plate portion 112 of shaft 100. Face plate 90 is aligned so that a shaft securing screw 96 is threaded into bore 94 to engage flat side 114 to securely connect face plate 90 and shaft 100. Center portion 26 of housing 20 has an opening 36 therein which allows a screwdriver to be inserted horizontally into housing 20 to access screw 96.

Face plate 90 is shown having an exterior circular ring 91 and a plurality of inward-extending ribs 97. Ribs 97 contain a plurality of bores 98 therethrough which can be used to attach a wooden workpiece 6 to face plate 90 by screwing wood screws 99 downward through the desired bores 98 into a workpiece 6. The bores 98 closer to ring 91 will be used for attaching "larger" workpieces and the bores 98 further from ring 91 will be used for attaching "smaller" workpieces.

It was previously mentioned that for the preferred embodiment workpiece 6 has maximum dimensions of 5½" by 5½" by 1" thick. Bushing 120 is sized so that the maximum routing depth into workpiece 6 is ½", although, in making rosettes, the routing depth is usually selected to be between ⅛" and ¼", for example. Further, for safety, in this preferred embodiment, it is recommended that the maximum routing depth into workpiece 6 be ⅜". In making a rosette, workpiece 6 is going to be pushed down onto a router bit 9 contained by router 8 and rotated to rout a circular cut into workpiece 6. A 1" board has an actual thickness of ¾". Screws 99 should be sized so as to not go into a 1" board more than ¼", so that the router bit 9 cannot hit the screws 99 and thereby damage the workpiece 6 and/or the router bit 9 and/or the router operator. If "longer" screws 99 are used, then the routing depth should be appropriately reduced. Screws 99 can also have washers, not shown, inserted thereon.

For a workpiece 6, having an actual thickness of less than ¾", a spacer block, not shown, should be attached between workpiece 6 and face plate 90. The spacer block should be sized so that the actual combined thickness of the spacer block and the workpiece 6 is between ¾" and 1". Also, if using screws to attach the spacer block to the workpiece 6, the screws should be placed outside the maximum cutting profile of the router bit 9. The position on workpiece 6 directly below bore 92 is identified as zero point 7 and the maximum off-set of the accessory 10 from zero point 7 of the preferred embodiment is 2⅛", for example. Assuming a ⅜" diameter router bit 9, the screws attaching the spacer block to the workpiece 6 should be at least 2½" from zero point 7 (the sum of the maximum 2⅜" off-set and half the ⅜" diameter of the router bit). This spacing will ensure that the router bit 9 cannot hit the screws attaching the spacer block to the workpiece 6.

The operation of accessory 10 will be described, assuming that a 5½" by 5½" by 1" thick workpiece 6 is to have two concentric centered circular ¼" deep rosette cuts made therein, the first cut being 1" from the center of workpiece 6 and the second cut being 2" from the center of workpiece 6. Assembled accessory 10, less face plate 90, is assumed to be installed on a router table 2 by appropriately installing connecting rod 24 to connect rear router table connecting portion 22 to router table brackets 3 and clamp rod 48 and its associated washer 50 and wing nut 52 are assumed installed into the correct bore 44 or 46, as appropriate for the selected router table 2. In this configuration, legs 39 and an underneath portion of front router table connecting portion 42 will sit on the top of router table 2. Further, feet 40 engage router table slot 5.

With clamp rod 48 not securing accessory 10 to the front of table 2, accessory 10 can be pivoted upward from its front, rod 24 acting as a pivoting axis. This permits easy access to accessory 10's underneath portion, where face plate 90 is to be installed, and permits access to the router bit 9. Router 8 is attached to router table 2 as appropriate for the selected table. A router bit 9, appropriate for the desired circular cut, is selected and installed into router 8. It is noted that many router bits can be selected to make the desired cut, but for use with the accessory 10 of the preferred embodiment, it is recommended that ⅜" be the maximum diameter of the router bit.

As the concentric cuts are to be equidistant from the center of the workpiece 6, workpiece 6 is to be attached to face plate 90 with the center of workpiece 6, identified as zero point 7, in line with the axis of shaft 100. One way to locate zero point 7 is to draw two diagonal lines on the back on workpiece 6 from the opposite corners of workpiece 6, the intersection of the two lines identifying zero point 7. To attach face plate 90 to workpiece 6 so that zero point 7 will be properly centered below shaft receiving bore 92, and, therefore, below the axis of shaft 100, a compass can be used to draw a 4" diameter circle centered at the intersection of the two drawn lines. This circle coincides with the diameter of circular ring 91 of face plate 90 in the preferred embodiment. Locate circular ring 91 on the outline of the circle and screw screws 99 through desired bores 98 to secure workpiece 6 to face plate 90. As one alternative to using a compass, a nail, such as, for example, a finishing nail, can be nailed into the workpiece 6 at the intersection of the two drawn lines. Face plate 90 can then be placed on workpiece 6 so that the nail extends upward through bore 92. With the nail centered in bore 92, screws 99 can be used to attack face plate 90 and workpiece 6. The nail can then be removed.

With accessory 10 pivoted upward off of table 2, face plate 90 with its attached workpiece 6 is to be secured to the face plate portion 112 of shaft 100. This is accomplished by pushing shaft receiving bore 92 onto the end of face plate portion 112. Face plate 90 with its attached workpiece 6 should be positioned so that an appropriate screwdriver can be inserted through housing opening 36 to engage shaft securing screw 96. Handle 150 should be turned so that the end of screw 96 can engage flat side 114. Screw 96 is then tightened against flat side 114, to secure shaft 100 and face plate 90 with its attached workpiece 6. In operation, handle 150 will be rotated, which rotates shaft 100, face plate 90, and workpiece 6. Flat side 114 prevents shaft 100 from turning inside bore 92.

Accessory 10 with attached face plate 90 and workpiece 6 is then lowered to rest on router table 2. Clamp rod 48 should be pivoted under the front edge of router table 2 and wing nut 52 tightened to secure accessory 10 to table 2 for routing. Before turning on the router 8, the bit 9 must be positioned, the maximum desired depth of cut must be set, and the off-set from zero point 7 must be set. Bit 9 is raised toward workpiece 6 until the top of the bit 9 is just slightly below the workpiece 6 surface to be routed. For example, the bit 9 should be within 1/16" of workpiece 6.

For our example, we desire to make ¼" deep rosette cuts. To set the maximum cutting depth of ¼", downward pressure should be exerted on handle 150 to cause workpiece 6 to touch router bit 9. In this configuration, bushing 120 is rotated on shaft 100 threaded adjustment portion 106 until the distance between the downward limiter portion 121 of bushing 120 and the top opening of shaft bore 70 of index flange 60 is ¼". This arrangement provides means for limiting the maximum possible downward vertical movement of workpiece 6. Graduated markings 124, spaced ⅛" apart, can be used to help set this ¼" spacing. To ensure that bushing 120 does not move, threaded adjustment knob 140 is rotated on shaft 100 threaded adjustment portion 106 so that knob 140, washer 130, and bushing 120 are "locked" together, to fix the maximum depth of cut at ¼".

Further, in this example, we are to make a first cut 1" from the center of workpiece 6 and a second cut 2" from the center of workpiece 6. First, to explain how the zero point 7 of workpiece is off-set from router bit 9 the desired radial distance, as is seen in the drawings, with index flange 60 rotated within index flange receiving portion 28 of housing 20 so that radius pointer is aligned with the 0" off-set radius indicator 38, the axis of shaft 100, and thus workpiece 6 zero point 7, is directly over router bit 9. The center of rotation of index flange 60 is identified by the numeral 78. To rotate index flange 60 within index flange receiving portion 28 of housing 20, lock knobs 80 must be loosened. In rotating index flange 60 counter-clockwise so that radius pointer 68 moves from the 0" off-set radius indicator 38 to the maximum 2⅛" off-set radius indicator 38, the axis of shaft 100 moves along the line identified by the numeral 101. For example, if radius pointer 68 is aligned with the 2⅛" off-set radius indicator 38, the horizontal distance from the tip of the router bit 9 to the zero point 7 on workpiece is 2⅛". Further, with this alignment, if handle 150 is rotated at least 360 degrees, workpiece 6 will rotate about zero point 7 so that a complete circular path 2⅛" equidistant from zero point, will pass over the tip of router bit 9.

So, therefore, if the first cut to be made is the cut with a radius from zero point 7, index flange 60 is rotated within index flange receiving portion 28 so that radius pointer 68 is aligned with the 1" off-set radius indicator 38. Lock knobs 80 are then tightened into respective nuts 84 to secure index flange 60 within index flange receiving portion 28. Radius pointer 68 and radius off-set indicators 38 provide means to indicate the radial horizontal off-set distance of workpiece 6 zero point 7 from the router bit 9.

Now that the maximum depth of cut of ¼" is fixed and the 1" radius from zero point 7 is fixed, the first cut can be made. Because of the direction of rotation of router bit 9, the operator should make the majority of the cut by rotating handle 150 in a clockwise direction as indicated by rotation direction indicator 79. With no pressure on handle 150, the router 8 should be turned on. Because workpiece 6 is just above bit 9, router 8 can be started without resistance. With the router 8 running, the operator should start continuous clockwise rotation of handle 150, and thus workpiece 6. While continuously rotating handle 150, the operator should exert downward pressure on handle 150, thereby slowly lowering the workpiece 6 to engage router bit 9. Continuous downward pressure and continuous rotation should be continued until the 1" circular cut is made having a depth of ¼". This depth is reached when downward limiter portion 121 of bushing 120 touches the top opening of shaft bore 70 of index flange 60. It is noted that anytime the operator eases the downward pressure or lets handle 150 go, spring 116 pushes bushing 120 upward so that workpiece 6 no longer contacts bit 9. This functions to provide means to exert an upward vertical force on the means to vertically move the workpiece 6.

With the cut complete, the operator can rotate handle 150 in a counter-clockwise direction to "clean-up" or smooth the cut. The router should then be turned off. Lock knobs 80 should be loosened and index flange should be rotated within index flange receiving portion 28 so that radius pointer 68 is aligned with the 2" off-set radius indicator 38 to prepare to make the second cut. Lock knobs 80 are then retightened. As the depth of cut is still to be ¼", no adjustment of bushing 120 on shaft 100 is necessary. The operator is ready to turn on the router 8 again and make the second cut, concentric with the first cut, but 2" from zero point 7. After making both cuts, wing nut 52 is loosened so that accessory 10 can be raised to access routed workpiece 6. Screw 96 is loosened by inserting a screwdriver through housing 20 opening 36 and face plate 90 with attached workpiece 6 is removed from shaft 100. Screws 99 are removed to separate routed workpiece 6 from face plate 90.

From the above description of the preferred embodiment, it is seen that means to vertically position a workpiece above a router bit contained by a router attached to a router table is provided by using screws 99 to screw workpiece 6 to face plate 90, by further connecting face plate 90 to shaft 100 using screw 96, and by further locking housing 20 to table 2 by tightening wing nut 52 on clamp rod 48, wherein shaft 100 is contained in shaft bore 70 of index flange 60 and wherein index flange 60 is contained in index flange portion 28 of housing 20.

With workpiece 6 connected to face plate 90 and face plate 90 connected to shaft 100, the extension of the axis of shaft 100 identifies the zero point 7 on workpiece 6. Means to horizontally off-set this zero point 7 of workpiece 6 a preselected horizontal radial distance from the router bit 9 is provided by the rotation of index flange 60 about center of rotation 78, index flange 60 rotating within index flange receiving portion 28 of housing 20, so that zero point 7 moves along curved line 101 until zero point 7 is at the desired preselected horizontal radial distance from the router bit 9.

Means to vertically move the workpiece 6 to engage router bit 9 is provided by the vertical movement of shaft 100 within bore 70. The upward limit of movement is controlled by "E"-ring 118 touching the bottom opening of bore 70. Upward movement is encouraged by spring 116. The downward limit of movement is controlled by the positioning of bushing 120 on shaft 100, which can be changed.

Means to rotate workpiece 6 about its zero point 7 to rout a circular cut equidistant from zero point 7 is provided by the rotation of handle 150 which is secured to shaft 100 by pin 160, shaft 100 being inserted into bore 92 of face plate 90 with screw 96 in bore 94 engaging flat side 114 of face plate portion 112 of shaft 100 to cause handle 150, shaft 100, face plate 90, and workpiece 6 to rotate in unison.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A router accessory, comprising:
  a. a housing connectable to a router table and securable thereon;
  b. means to vertically position a workpiece above a router bit, said router bit being contained by a router attached to said router table, said workpiece having a preselected zero point;
  c. means to horizontally off-set said zero point of said workpiece a preselected horizontal radial distance from said router bit;
  d. means to vertically move said workpiece to engage said router bit; and,
  e. means to rotate said workpiece about said zero point to rout a circular cut, said circular cut being equidistant from said zero point.

2. The router accessory of claim 1, further comprising: means for limiting the maximum possible downward vertical movement of said workpiece.

3. The router accessory of claim 1, further comprising: means to exert an upward vertical force on said means to vertically move said workpiece to engage said router bit.

4. The router accessory of claim 1, further comprising: means to indicate the radial horizontal off-set distance of said workpiece zero point from said router bit.

5. A router accessory attachable to a horizontal router table which has a router attached thereto, the router having a preselected router bit, the router bit extending vertically upward, the router accessory comprising:
  a. a housing having a rear router table connecting portion, a center portion, and a front router table connecting portion; said rear router table connecting portion and said front router table connecting portion connectable to a router table and securable thereon; said center portion having legs which can support said housing on said router table; said center portion having a vertical opening therethrough, said opening being an index flange receiving portion; said center portion having a pair of vertical lock knob bores therethrough;
  b. a pair of lock knobs, each lock knob having a lock knob washer inserted thereon, and a pair of lock knob nuts;
  c. an index flange having a received portion, a lockable lip portion, and a top portion; said received portion being received in said index flange receiving portion of said housing center portion and rotatable therein about a vertical index flange center of rotation; said lock knobs each having a washer inserted thereon being inserted into said pair of vertical lock knob bores, each lock knob having one of said lock knob nuts threaded thereon, said lock knobs and lock knob nuts being securable so that said lock knob washers engage said lockable lip portion and said housing top portion to prevent rotation of said index flange received portion within said index flange receiving portion of said housing center portion; said index flange having a vertical shaft bore therethrough, said vertical shaft bore not intersecting said vertical index flange center of rotation, said shaft bore having a topmost adjustment bushing receiving portion having a first preselected uniform diameter, a middle compression spring receiving portion having a preselected minimum diameter, a bottommost shaft receiving portion having a second preselected uniform diameter, said middle portion minimum diameter being greater than said second preselected diameter such that there is a compression spring lip between said middle and said bottommost portions;
  d. a face plate having a central vertical shaft receiving bore therethrough, a threaded horizontal bore connecting to said vertical shaft receiving bore, at least one horizontal rib for attaching a workpiece; said at least one rib having at least one vertical bore therethrough for attaching a workpiece to be routed; said threaded horizontal bore connecting to said vertical shaft receiving bore having a shaft securing screw threaded therein;
  e. an E-ring;
  f. a compression spring;

g. an adjustment bushing having an inner threaded portion and a downward limiter portion;

h. a threaded adjustment knob;

i. a handle having a vertical shaft bore therein and a horizontal pin bore therethrough, said vertical shaft bore and said horizontal pin bore intersecting;

j. a handle attaching pin;

k. a rotatable vertical shaft having a handle portion, a threaded adjustment portion, a spring receiving portion, and a face plate portion; said spring receiving portion and said face plate portion having a horizontal groove therebetween; said handle portion having a horizontal pin bore therethrough; said face plate portion having a flat side portion; said adjustment bushing and said threaded adjustment knob being threaded onto said shaft threaded adjustment portion; said handle vertical shaft bore being inserted onto said shaft handle portion so that said handle horizontal pin bore and said shaft handle portion pin bore are aligned, said handle attaching pin inserted therethrough securing said handle to said shaft; said threaded adjustment knob being between said handle and said adjustment bushing; said compression spring being placed over said shaft; said shaft with said compression spring inserted into said index flange shaft bore, said shaft face plate portion extending vertically downward below said index flange vertical shaft bore bottommost shaft receiving portion with said E-ring being retained by said horizontal groove between said shaft spring receiving portion and said shaft face plate portion; said adjustment bushing being received by said index flange shaft bore topmost adjustment bushing receiving portion; said compression spring being retained between said adjustment bushing and said index flange compression spring lip; the rotation of said index flange about said vertical index flange center of rotation causing said shaft to move in a horizontal direction with respect to a router bit;

whereby a workpiece can be attached to said face plate at least one rib and said face plate central vertical shaft receiving bore can be placed onto said shaft face plate portion so that said shaft securing screw can be tightened to engage said shaft face plate portion flat side portion thereby permitting said handle, said shaft, said face plate, and said workpiece to be rotated in unison by the turning of said handle; whereby said adjustment bushing can be threadable moved on said shaft threaded adjustment portion to select a desired maximum routing depth; whereby said index flange can be rotated about said vertical index flange center of rotation to move said shaft to a desired horizontal distance from said router bit, said lock knobs being tightened to prevent said distance from changing; and, whereby said handle can be rotated and have a downward vertical force exerted thereon to cause said workpiece to engage said router bit and thereby rout a circular cut into said workpiece as limited by said adjustment bushing.

6. The router accessory of claim 5, wherein:

a. said index flange top portion includes a radius pointer; and, b. said housing top portion includes a plurality of graduated radius indicators, said radius pointer aligned to indicate the horizontal distance between said shaft and said router bit.

7. The router accessory of claim 5, wherein: said adjustment bushing includes at least one marking thereon to aid when threadably moving said adjustment bushing on said shaft threaded adjustment portion to select a desired maximum routing depth.

8. The router accessory of claim 5, further comprising: a washer, said washer being on said rotatable vertical shaft at a location between said adjustment bushing and said threaded adjustment knob, said washer functioning to help maintain said adjustment bushing and said threaded adjustment knob as positioned on said shaft.

9. The router accessory of claim 5, wherein: said housing rear router table connecting portion includes a horizontal bore therethrough, said horizontal bore functioning to receive a connecting rod associated with a router table rear bracket to hingedly connect said accessory to said router table.

10. The router accessory of claim 9, wherein: said housing front router table connecting portion includes a vertical bore therethrough, said bore receiving a router table clamp rod, said router table clamp rod having a nut thereon, wherein said nut is tightenable to secure said accessory onto said router table.

11. The router accessory of claim 5, further comprising: a pair of downward extending feet, said feet being attached to said housing center portion and extending downward further than said legs which can support said housing on said router table, said feet being positioned to engage a horizontal router table slot.

12. The router accessory of claim 5, wherein: said index flange can be rotated about said vertical index flange center of rotation to move said shaft to a zero point position, wherein when said shaft is at said zero point, said shaft is at a position vertically above said router bit.

13. The router accessory of claim 5, wherein: said compression spring retained between said adjustment bushing and said index flange compression spring lip exerts an upward force onto said adjustment bushing.

* * * * *

UNITED STATES PATENT AND TRADEMARK OFFICE
CERTIFICATE OF CORRECTION

PATENT NO. : 5,271,441
DATED : Dec. 21, 1993
INVENTOR(S) : Ved P. Gakhar; Richard A. Dossett, both of Louisville, KY It is certified that error appears in the above-indentified patent and that said Letters Patent is hereby corrected as shown below:

Column 2, line 43, delete ","

Column 3, line 62, delete "2½"" insert --2 1/8"--

Column 3, line 63, delete "2½"" insert --2 1/8"--

Column 3, line 63, delete "½"" insert --1/8"--

Column 3, line 65, delete "2"" insert --1/8"--

Column 3, line 67, delete "2½"" insert --2 1/8"--

Column 4, line 2, delete "2½"" insert --2 1/8"--

Column 5, line 1, delete "½"" insert --1/8"--

Column 6, line 13, delete "3/4"" insert --3/8"--

Column 6, line 38, delete "2 3/4"" insert --2 1/8"--

Column 6, line 38, delete "1/8"" insert --3/4"--

UNITED STATES PATENT AND TRADEMARK OFFICE
CERTIFICATE OF CORRECTION

PATENT NO. : 5,271,441
DATED : Dec. 21, 1993
INVENTOR(S) : Ved P. Gakhar; Richard A. Dossett, both of Louisville, KY It is certified that error appears in the above-indentified patent and that said Letters Patent is hereby corrected as shown below:

Column 8, line 7, after "pointer" insert --68--

Column 8, line 27, after "a" insert --1"--

Signed and Sealed this

Fourth Day of October, 1994

Attest:

BRUCE LEHMAN

*Attesting Officer*     *Commissioner of Patents and Trademarks*